United States Patent [19]

Flynn et al.

[11] 4,065,388
[45] Dec. 27, 1977

[54] PROCESS FOR REMOVAL OF UNDISSOLVED IMPURITIES FROM ION EXCHANGE RESIN

[75] Inventors: George Flynn, Bridgewater Township, N.J.; Eli Salem, Brooklyn, N.Y.

[73] Assignee: Ecodyne Corporation, Union, N.J.

[21] Appl. No.: 663,369

[22] Filed: Mar. 3, 1976

[51] Int. Cl.² .............................................. B01D 23/24
[52] U.S. Cl. ...................................... 210/80; 210/279
[58] Field of Search ................. 210/32, 30 R, 35, 190, 210/269, 274, 279, 80

[56] References Cited

U.S. PATENT DOCUMENTS

| | | | |
|---|---|---|---|
| 1,794,841 | 3/1931 | Elfreth | 210/274 |
| 2,789,695 | 4/1957 | Winkler et al. | 210/274 |
| 2,803,347 | 8/1957 | Whitlock, Jr. | 210/32 |
| 3,385,787 | 5/1968 | Crits et al. | 210/32 |
| 3,455,819 | 7/1969 | Crits | 210/32 |
| 3,537,989 | 11/1970 | Crits | 210/32 |
| 3,583,908 | 6/1971 | Crits | 210/32 |
| 3,613,888 | 10/1971 | Harris | 210/80 |
| 3,680,701 | 8/1972 | Holca | 210/274 X |
| 3,765,535 | 10/1973 | Anderson et al. | 210/274 |
| 3,970,555 | 7/1976 | Savage et al. | 210/274 |

*Primary Examiner*—Frank A. Spear, Jr.
*Assistant Examiner*—E. Rollins Cross
*Attorney, Agent, or Firm*—David A. Anderson; Gary M. Ropski

[57] ABSTRACT

A process for scrubbing undissolved impurities from the upper portion of an ion exchange resin filtration bed is disclosed wherein air is introduced in the upper portion of the bed and develops a pressure within the vessel. This pressure subsequently forces rinse water down through the upper portion of the bed and out of the vessel. The gas is introduced into the bed and the water is drained therefrom at a level below the bed's upper surface but above a substantial lower portion of the resin bed. In this manner, lesser quantities of scrubbing fluids are required and the majority of the resin material is left undisturbed to maintain maximum ion exchange capacity.

7 Claims, 1 Drawing Figure

U.S. Patent    Dec. 27, 1977    4,065,388
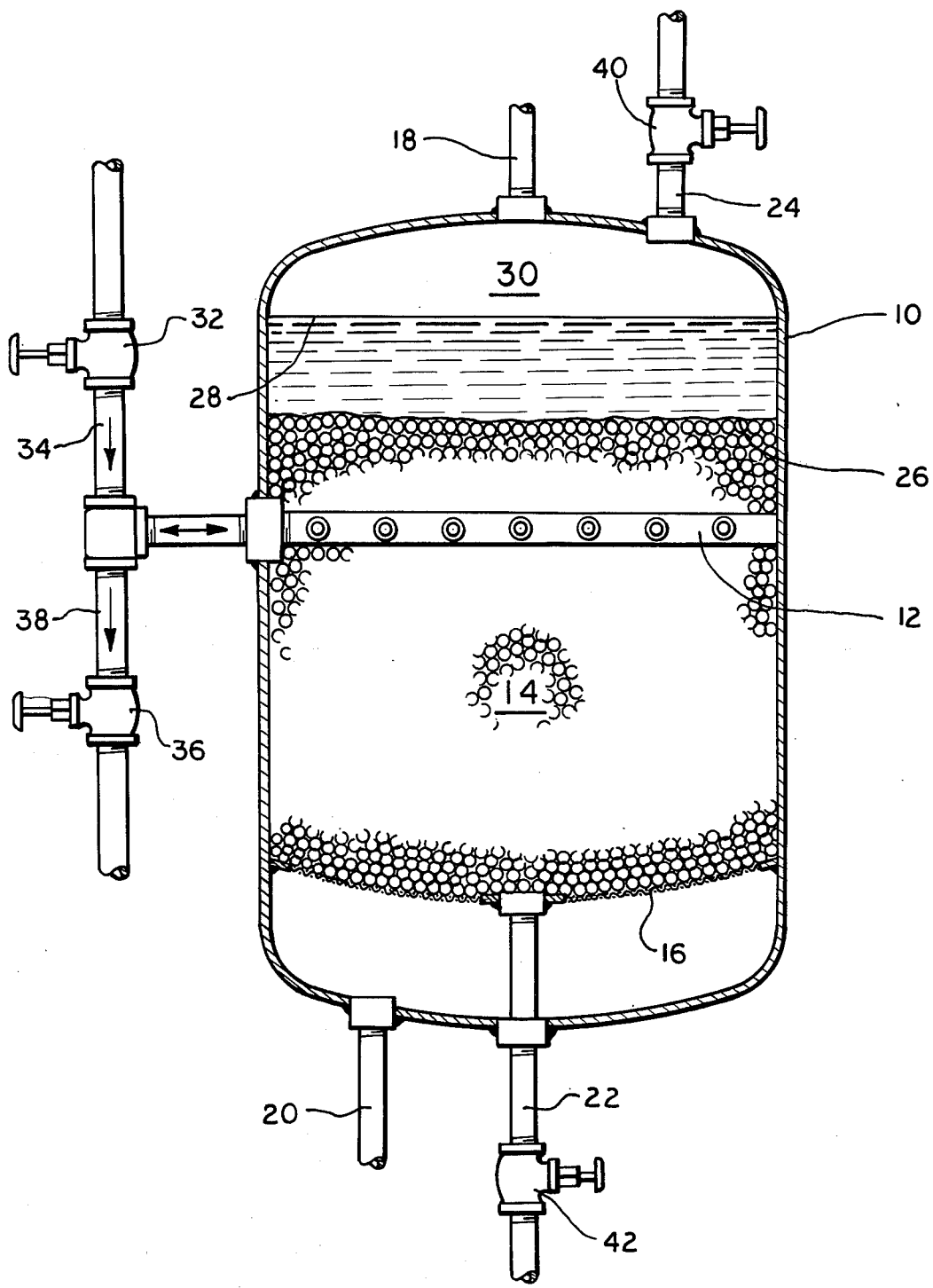

PROCESS FOR REMOVAL OF UNDISSOLVED IMPURITIES FROM ION EXCHANGE RESIN

BACKGROUND AND SUMMARY OF THE INVENTION

The present invention relates to filtration systems which employ ion exchange resins as the filter media. In particular the invention relates to an improved process whereby undissolved solids which have been filtered from the water being treated may be removed from the upper portion of the ion exchange resin bed while the resins remain in an in line service vessel and without disturbing or reorientating the resins in the lower portion of the bed.

It is, of course, well known in the water filtration art that water demineralizers which employ deep beds of anion and cation exchange resins will remove from the water being purified therein both dissolved and undissolved impurities. Depending on the quantity and character of the water being treated, the bed of ion exchange resins may first be chemically exhausted or it may first be contaminated with undissolved impurities to the extent where excessive pressure drops are encountered. When the resins have been chemically exhausted, they must be chemically regenerated in order to restore their capacity to remove dissolved impurities. On the other hand, contamination of the resin bed with undissolved solids requires physical cleansing of the resins in order to return pressure drops to acceptable levels.

In some instances, and with particular reference to condensate polishing units in power generating systems, such demineralizing units have their usefulness terminated by reason of the accumulation of undissolved impurities rather than by the attainment of a condition of ineffective ion exchange. Under such circumstances prior art processes generally utilize a backwashing technique wherein a liquid is passed through the bed of ion exchange resins in a direction reverse to that of the filtrate. In addition, some prior art processes, such as that disclosed in U.S. Pat. No. 3,455,819, introduce air or other inert gases into the bed to facilitate the cleaning or scrubbing of the resins.

Such prior art processes, however, suffer from several disadvantages. First, since the backwashing fluids are introduced at the bottom of the bed, the entire bed is disturbed and reorintated during backwash. This reorientation of the ion exchange resins can adversely effect chemical removal effectiveness, thereby lowering effluent quality. In addition, since the entire bed is being scrubbed, substantial amounts of backwash water must be utilized to conduct the process, thereby posing waste treatment problems, particularly in nuclear condensate systems.

Accordingly, the present invention provides a novel process for removing undissolved impurities from an ion exchange resin filtration unit. Significantly, it has been discovered that by scrubbing only the upper portion of the resin bed, where the concentration of such impurities is highest, acceptable pressure drops may be maintained and leakage of such impurities may be avoided without incurring the undesirable consequences of prior art processes outlined above. Thus, the greater portion of the resin bed remains undisturbed throughout the process and lesser quantities of backwashing liquids are required. In addition, since smaller quantities of resin are being scrubbed, the time required for undissolved solids removal is shortened thereby minimizing the time during which the unit is out of service.

The novel features which are believed to be characteristic of the invention are set forth in the appended claims. The invention itself, however, together with further objects and attendant advantages thereof, will be best understood by reference to the following description taken in connection with the accompanying drawing which illustrates in cross-section a conventional filtration vessel incoporating certain structural modifications suitable for use in the practice of the present invention.

DETAILED DESCRIPTION OF THE INVENTION

Referring to the drawing, an ion exchange vessel 10 is illustrated having suitable valving and manifold device 12.

The vessel 10 includes a charge of ion exchange resins maintained as a deep bed 14 which is supported by an underdrain or distibuting assembly shown as a conventional screen 16. The ion exchange resins act to a considerable extent as a filter so that undissolved impurities are trapped in the resin, the impurities having a concentration gradient, as the service run proceeds, which is generally greatest at the top of the bed when the flow of filtrate is downward.

Communicating with the vessel 10 are typical connections for the service functions, such connections include the service inlet pipe 18, the service outlet pipe 20, the resin transfer pipe 22 and the vent pipe 24.

For purposes of description, the bed 14 may be anion exchange resin, cation exchange resin or a mixed bed composed of both types of resins. In addition, the vessel 10 is the vessel in which the resin is disposed during on-stream operation. Accordingly, there is no need to transfer the resin to an auxiliary tank which process would require additional volumes of water and would defeat a major object of the invention, that is, to avoid disturbance of the major portion of the bed.

During service flow contaminated water flows into vessel 10 via pipe 18 filling the vessel and compacting the bed 14 such that its upper surface is generally located as indicated by reference numeral 26. The filtrate flows downwardly through bed 14 and out of the vessel through service outlet pipe 20.

When the effluent from the line 20 begins to evidence contamination with suspended and undissolved impurities or when the pressure drop through bed 14 becomes unacceptably high, the process of the present invention is utilized to return the unit to proper operating conditions.

In accordance with the present invention, at the termination of a service run the water level in vessel 10 is adjusted to a level intermediate the upper surface 26 of the resin bed and the top of the vessel. Thus, by lowering the water level as shown by reference numeral 28, a freeboard area 30 is provided in the uppermost portion of the vessel. Next, a gas, preferably air, is introduced into the vessel 10 at a level below the upper surface 26 of the resin bed but above a substantial lower portion thereof. The gas is introduced into vessel 10 via gas inlet valve 32, pipe 34 and the manifold 12. The manifold 12 includes a series of conduits and orifices which enable a substantially uniform distribution of scrubbing fluid across the entire area of resin bed 14.

The gas passes through the upper portion of bed 14, scrubbing from the ion exchange resins the undissolved impurities contained therein and suspending these materials in the water standing above the upper surface 26 of the bed.

The gas introduced into the vessel 10 is collected in the freeboard area 30 until a predetermined pressure is developed, at which point the air inlet valve 32 is closed and drain valve 36 is opened. The pressure developed in the vessel 10, which is typically in the range of 40 p.s.i., forces a portion of the liquid above the manifold down through the upper portion of the bed and out of the vessel via manifold 12 and drain pipe 38. In this manner the portion of the resin bed containing the greatest concentration of undissolved impurities can be scrubbed without disturbing the orientation of the lower portion of the bed and thereby retaining maximum ion exchange capacity in the greater portion of the bed.

The gas introduction and water drain levels within vessel 10, and relative to resin bed 14, are an important aspect of the present invention. Preferably, the gas is introduced into the vessel and the contaminated rinse water is drained therefrom through a common manifold as has been illustrated herein above. The manifold or other suitable inlet and outlet connections should be positioned below the upper surface of the bed but above a substantial lower portion thereof. For example, in a deep bed demineralizer having an overall depth of 36 to 48 inches, the manifold 12 is preferably located about 8–12 inches below the bed's upper surface. Of course, in any given ion exchange filtration system the exact locations of the gas introduction level and rinse water drain level will depend upon the character and quantity of particulate contamination, the degree to which undissolved impurities can be tolerated within the system and the need to maintain maximum chemical removal effectiveness in the undisturbed, lower portion of the bed.

In accordance with preferred embodiments of the present invention, the freeboard space 30 within the vessel 10 is vented through vent pipe 24 and valve 40 for a predetermined period of time after the gas introduction step has been initiated. This will allow additional scrubbing of the upper portion of the bed to enhance impurity removal, prior to the gas collecting and gas termination steps. In addition, the steps of gas introduction, gas collection and termination, and liquid drain may be repeated, or the entire process may be repeated, any number of times to effect a more complete removal of undissolved impurities.

After completing the scrubbing process as disclosed hereinabove, the valves 32, 36, 40 and 42 are all closed and the vessel 10 is purged via pipes 18 and 20. After purging the unit is ready for service and the appropriate connections (not shown) are opened to return the unit to in-line operation.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. A process for cleaning particulate impurities from a bed of ion exchange resins contained in a filtration vessel, comprising:

adjusting the level of liquid within said vessel to a point intermediate the top of said vessel and the upper surface of said bed to provide a freeboard area within said vessel;

introducing a gas into said vessel at a level below the upper surface of said resin bed but above a substantial lower portion thereof, thereby scrubbing said particulate impurities from the resin above said gas introduction level and suspending said impurities in said liquid;

collecting said gas in said freeboard area of said vessel and terminating said gas introduction upon reaching a predetermined pressure within said vessel; and draining a portion of said liquid containing said suspended mpurities from said vessel at a level generally equal to said gas introduction level.

2. The process of claim 1 wherein the steps of gas introduction, gas collection and termination and liquid draining are repeated to effect a more complete removal of the liquid within said vessel above said gas introduction level.

3. The process of claim 1 wherein said gas is vented from said freeboard area of said vessel for a predetermined period of time prior to said gas collecting step.

4. The process of claim 3 wherein said steps of gas introduction, gas venting, gas collection and termination and liquid draining are repeated to effect a more complete removal of the liquid within said vessel above said gas introduction level.

5. The process of claim 1 wherein the sequence of steps is repeated to effect a more complete removal of said particulate impurities from said resin bed.

6. The process of claim 1 wherein the gas is introduced into said vessel and the liquid is drained from said vessel through a single manifold device or dual manifold devices positioned below the upper surface of said bed.

7. The process of claim 1 wherein resin bed is a deep bed containing both anion and cation exchange resins or the individual resin components and said filtration vessel is an in line service vessel of a condensate polishing system.

* * * * *